US010387032B2

(12) United States Patent
Lane et al.

(10) Patent No.: US 10,387,032 B2
(45) Date of Patent: Aug. 20, 2019

(54) USER INTERFACE INPUT METHOD AND SYSTEM FOR HANDHELD AND MOBILE DEVICES

(71) Applicant: The Trustees of the University of Pennsylvania, Philadelphia, PA (US)

(72) Inventors: Stephen H. Lane, Princeton, NJ (US); Ji Hyun Kong, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/555,806

(22) PCT Filed: Mar. 4, 2016

(86) PCT No.: PCT/US2016/020934
§ 371 (c)(1),
(2) Date: Sep. 5, 2017

(87) PCT Pub. No.: WO2016/141306
PCT Pub. Date: Sep. 9, 2016

(65) Prior Publication Data
US 2018/0039402 A1    Feb. 8, 2018

Related U.S. Application Data

(60) Provisional application No. 62/152,805, filed on Apr. 24, 2015, provisional application No. 62/128,324, filed on Mar. 4, 2015.

(51) Int. Cl.
*G06F 3/0488* (2013.01)
*G06F 1/16* (2006.01)
(Continued)

(52) U.S. Cl.
CPC ........ *G06F 3/04883* (2013.01); *G06F 1/1626* (2013.01); *G06F 3/016* (2013.01); *G06F 3/0233* (2013.01); *G06F 2203/04808* (2013.01)

(58) Field of Classification Search
None
See application file for complete search history.

(56) References Cited

U.S. PATENT DOCUMENTS

2003/0184452 A1  10/2003  Goodgoll
2008/0252603 A1  10/2008  Dietz et al.
(Continued)

OTHER PUBLICATIONS

Notification of Transmittal of the International Search Report and the Written Opinion of the International Searching Authority, or the Declaration for International Application No. PCT/US2016/020934 (dated May 17, 2016).
Twiky Product, http://www.alphaui.com/twiky-product/ (2014).
Alpha Grip, http://sysmagazine.com/posts/214575/ (2014).
Octodon, http://sysmagazine.com/posts/214575/ (2014).
(Continued)

*Primary Examiner* — Kenneth B Lee, Jr.
(74) *Attorney, Agent, or Firm* — Jenkins, Wilson, Taylor & Hunt, P.A.

(57) ABSTRACT

Methods, systems, and computer readable media for receiving user input. According to one example method for receiving user input, the method includes identifying gestures from directional movements of a user's fingers on a touch sensor, mapping the gestures to alphanumeric characters, and outputting alphanumeric characters, including defining a set of the gestures as different sequences of at least two of: a contact event, a no contact event, a hold event, a finger movement in a first direction, a finger movement in a second direction.

32 Claims, 23 Drawing Sheets

(51) Int. Cl.
*G06F 3/023* (2006.01)
*G06F 3/01* (2006.01)

(56) References Cited

U.S. PATENT DOCUMENTS

| | | | | |
|---|---|---|---|---|
| 2011/0115719 | A1* | 5/2011 | Ng | G06F 1/1613 |
| | | | | 345/173 |
| 2011/0134068 | A1 | 6/2011 | Shimoni | |
| 2012/0174041 | A1* | 7/2012 | Queru | B60K 37/06 |
| | | | | 715/863 |
| 2014/0002346 | A1* | 1/2014 | Weddle | G06F 3/016 |
| | | | | 345/156 |
| 2014/0098023 | A1 | 4/2014 | Zhai et al. | |
| 2014/0143738 | A1* | 5/2014 | Underwood, IV | H04L 51/38 |
| | | | | 715/863 |

OTHER PUBLICATIONS

TrewGrip, http://sysmagazine.com/posts/214575/ (2014).
Twidler, http://sysmagazine.com/posts/214575/ (2014).
Alexander, "Canopy Tries Again with Pressure-Sensitive iPhone Case," Star Tribune, http://www.startribune.com/canopy-tries-again-with-pressure-sensitive-iphone-case/239710861/, pp. 1-2 (Jan. 13, 2014).
Cooper, "Canopy's Sensus App Enhancing Case Hands-On," Engadget, https://www.engadget.com/2014/01/09/canopy-sensus-app-enhancing-case/?guccounter=1, pp. 1-8 (Jan. 9, 2014).
D'Orazio, "Sensus Case Gives Your iPhone a Rear Touchpad like the PS Vita," The Verge, https://www.theverge.com/2014/1/8/5286754/sensus-case-gives-your-iphone-a-rear-touchpad-like-the-ps-vita, pp. 1-3 (Jan. 8, 2014).

* cited by examiner

| GESTURE# | STATE 1 | STATE 2 |
|---|---|---|
| 0 | N | N |
| 1 | C | N |
| 2 | H | N |
| 3 | L | N |
| 4 | R | N |
| 5 | H | LH |
| 6 | H | RH |
| 7 | L | LH |
| 8 | R | RH |
| 9 | U | N |
| 10 | D | N |
| 11 | H | UH |
| 12 | H | DH |
| 13 | U | UH |
| 14 | D | DH |
| 15 | L | U |
| 16 | L | D |
| 17 | R | U |
| 18 | R | D |
| 19 | U | L |
| 20 | U | R |
| 21 | D | L |
| 22 | D | R |

FIG. 12B

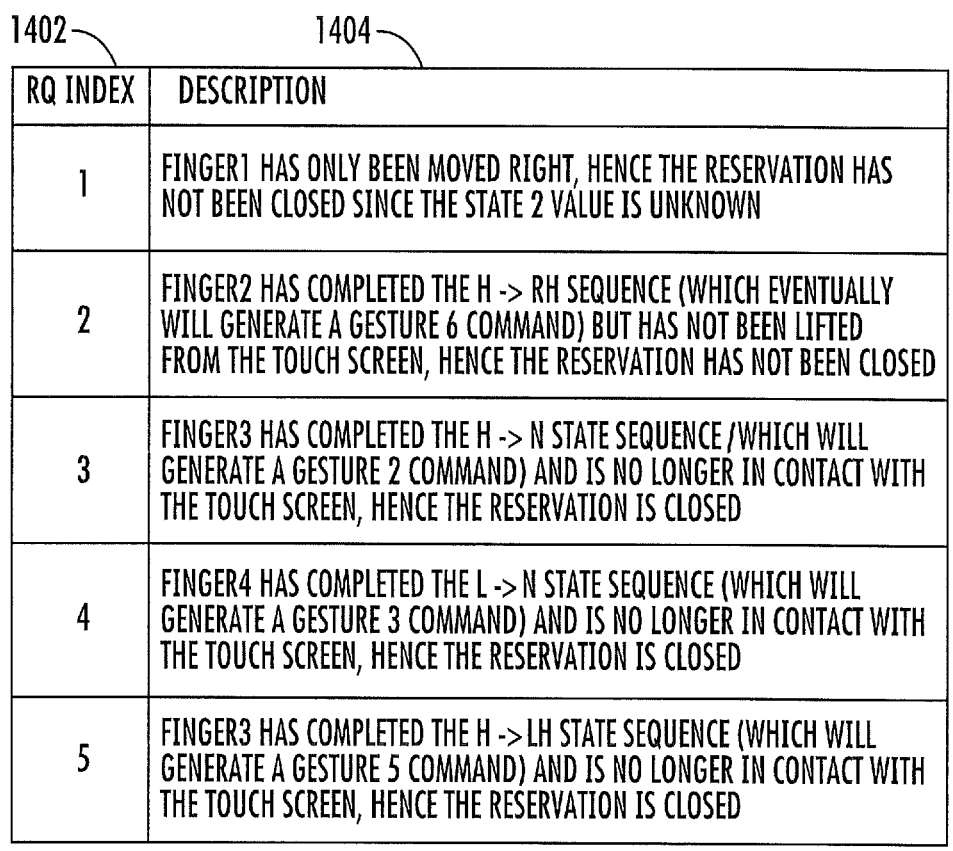

| RQ INDEX | DESCRIPTION |
|---|---|
| 1 | FINGER1 HAS ONLY BEEN MOVED RIGHT, HENCE THE RESERVATION HAS NOT BEEN CLOSED SINCE THE STATE 2 VALUE IS UNKNOWN |
| 2 | FINGER2 HAS COMPLETED THE H -> RH SEQUENCE (WHICH EVENTUALLY WILL GENERATE A GESTURE 6 COMMAND) BUT HAS NOT BEEN LIFTED FROM THE TOUCH SCREEN, HENCE THE RESERVATION HAS NOT BEEN CLOSED |
| 3 | FINGER3 HAS COMPLETED THE H -> N STATE SEQUENCE (WHICH WILL GENERATE A GESTURE 2 COMMAND) AND IS NO LONGER IN CONTACT WITH THE TOUCH SCREEN, HENCE THE RESERVATION IS CLOSED |
| 4 | FINGER4 HAS COMPLETED THE L -> N STATE SEQUENCE (WHICH WILL GENERATE A GESTURE 3 COMMAND) AND IS NO LONGER IN CONTACT WITH THE TOUCH SCREEN, HENCE THE RESERVATION IS CLOSED |
| 5 | FINGER3 HAS COMPLETED THE H -> LH STATE SEQUENCE (WHICH WILL GENERATE A GESTURE 5 COMMAND) AND IS NO LONGER IN CONTACT WITH THE TOUCH SCREEN, HENCE THE RESERVATION IS CLOSED |

FIG. 14

TRAIL MESSAGE

| MESSAGE ID# | TRAIL ID# | CREATE/DELETE/UPDATE | POSITION DATA |
|---|---|---|---|
| 1 | 1,2,3 OR 4 | DELETE=0, CREATE=1, UPDATE=2 | Xpos, Ypos |

1902

KAT CHARACTER MESSAGE

| MESSAGE ID# | FINGER ID# | STATE 1 | STATE 2 |
|---|---|---|---|
| 2 | 1,2,3 OR 4 | C, H, L, R, U, OR D | LH, RH, UH, DH, UL, UR, DL, DR, N |

1904

KAT GUI MESSAGE

| MESSAGE ID# | FINGER ID# | STATE 1 | STATE 2 |
|---|---|---|---|
| 3 | 1,2,3 OR 4 | C, H, L, R, U, OR D | LH, RH, UH, DH, UL, UR, DL, DR, N |

1906

KAT MAP DISPLAY MESSAGE

| MESSAGE ID# | DISPLAY CHARACTER MAP | DISPLAY LEGEND |
|---|---|---|
| 4 | HIDE=0, SHOW=1 | HIDE=0, SHOW=1 |

USER INTERFACE INPUT METHOD AND SYSTEM FOR HANDHELD AND MOBILE DEVICES

PRIORITY CLAIM

This application claims the benefit of U.S. Provisional Application Ser. No. 62/128,324, filed Mar. 4, 2015, the disclosure of which is incorporated herein by reference in its entirety. This application claims the benefit of U.S. Provisional Application Ser. No. 62/152,805, filed Apr. 24, 2015, the disclosure of which is incorporated herein by reference in its entirety.

TECHNICAL FIELD

The subject matter described herein relates generally to user interfaces and input methods for mobile devices with touchscreens, such as smartphones and tablets, as well as hand-held controllers and other devices where it is desirable for a user to enter data, text and commands without the need to visually keep track of how their fingers are registered with a keyboard layout on the display screen.

BACKGROUND

Over the past 5 years mobile devices have evolved from devices featuring separate keypads and displays to devices supporting integrated touch-based display screens (i.e. touchscreens). Although touchscreens have been around for a long while, it is the development of low-cost multi-media mobile devices with significant processing capabilities that have validated the utility of touchscreen interfaces and, as a result, account for their widespread popularity. The small screen size of most mobile devices, however, limits the user from taking full advantage of the available processing capabilities (today's smartphones are as powerful as computers in the 90s yet users can't do as much with their phones as they could with an old computer). Phones have gotten smaller, but human fingers have remained the same size. As a result, tasks involving editing, selecting and typing on mobile devices are still cumbersome because finger touch is imprecise ("fat finger/little screen") and only one or two fingers are typically used at a time. In addition, on small mobile devices, such as smartphones, the on-screen keyboard layout can often cover a majority of the viewable display area. In order to more fully exploit the incredible processing power of the next generation of smart portable electronics, additional types of intuitive user interfaces are needed to complement the functionality of touchscreens in a manner that is also well matched to human sensorimotor capabilities.

SUMMARY

The subject of this specification, Keyboard Alternative Technology (KAT), allows a user to enter all the alphabetic, numeric, punctuation, function and control characters found on a typical computer keyboard without looking using simple sequential finger movements (e.g. left, right, hold, up or down) that are tracked on the back facing side of their a mobile device. Unlike difficult to learn multi-press or chording keyboards, quick mastery of touch typing using KAT is achieved through display of an on screen "character map" which allows the user to easily determine the mapping between the various finger movements and the associated characters which are generated.

KAT overcomes or eliminates problems associated with typing alphanumeric text on miniature keyboards, accessing information while on the move, and entering pointing commands and text simultaneously on touch screen mobile devices used in games, Virtual Reality (VR) simulations and Augmented Reality (AR) applications. KAT also allows users of existing hand-held mobile devices featuring touchscreens, such as smartphones and tablets, to provide text-based input to other computer systems (i.e. desktop, laptop, wearable, etc.) with fixed or head-mounted displays, where the user does not need to look at the mobile device while typing text and commands.

BRIEF DESCRIPTION OF THE DRAWINGS

The subject matter described herein will now be explained with references to the accompanying drawings of which:

FIG. 12b is a chart illustrating two-state gesture sequences for both horizontal and vertical finger movements;

FIG. 14 is a chart illustrating an example scenario, where each numbered line is associated with a corresponding reservation queue index;

FIG. 19 is a chart illustrating the message formats for the four main KAT Message;

DETAILED DESCRIPTION

Figure 1:
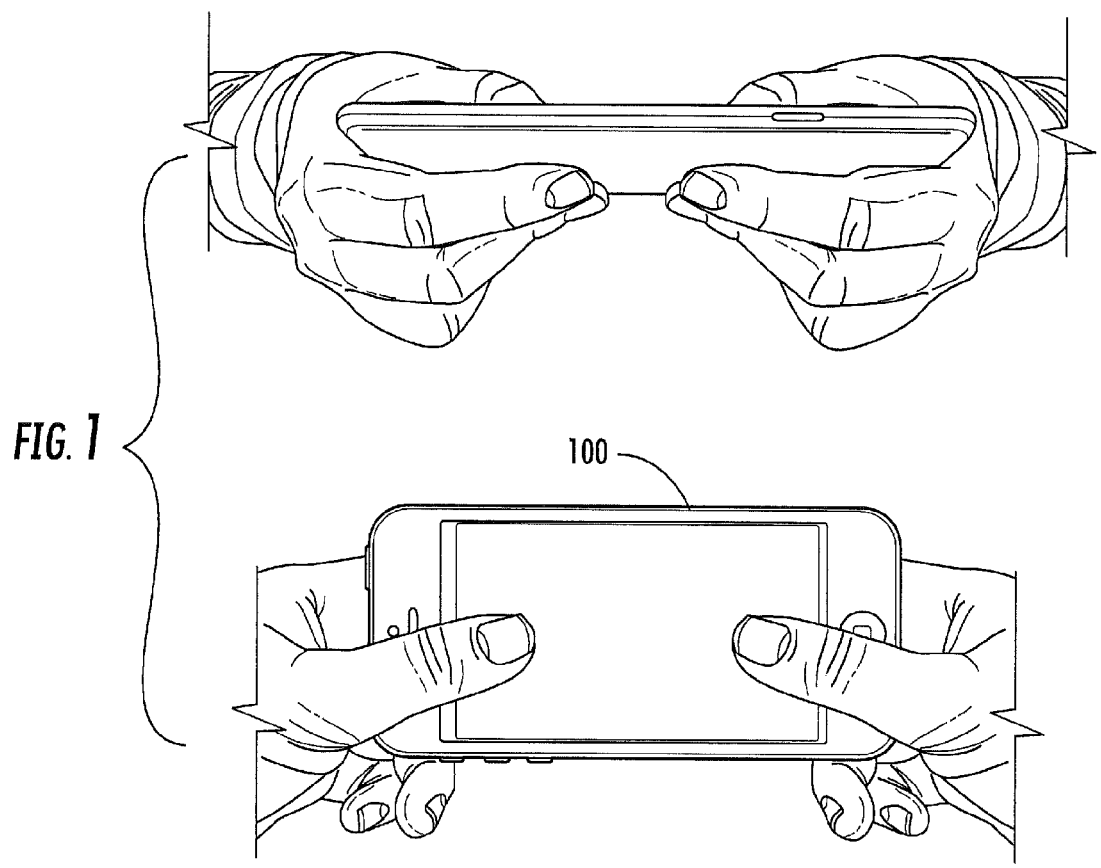
FIG. 1 is a diagram illustrating a user holding a hand-held device 100 that is configured to execute a KAT user interface.

FIG. 1 is a diagram illustrating a user holding a hand-held device 100 that is configured to execute a KAT user interface.

In one embodiment a KAT user interface allows entry of up to 144 alphanumeric characters utilizing the first two fingers (i.e. index and middle fingers) of the user's left and right hands. In some embodiments, the user holds a mobile device such as a smartphone between their left and right hands as shown in FIG. 1 and interacts with the system by touching a touch sensor on the back facing side of the device with the first two fingers on each hand and performing simple left, right, up, and down gesture-like movements to enter text, data and commands. The back facing touchscreen either can be directly integrated with the mobile device or made part of an external case that is separately attached to the mobile device (such as the cases commonly used to protect smartphones).

The touch screen sensor on the back of the mobile device allows the user to enter words and commands with the index and middle fingers of their left and right hands while their thumbs select, scroll and manipulate the content on a front touchscreen in a standard manner using tap, swipe, scale and drag-and-drop commands executed using thumb movements. The back facing touchscreen sensor shown in FIG. 1 can be either permanently attached or integrated with the mobile device or incorporated into a separate third party cover or shell accessory which is often used to protect mobile devices from damage and falls.

Figure 2:
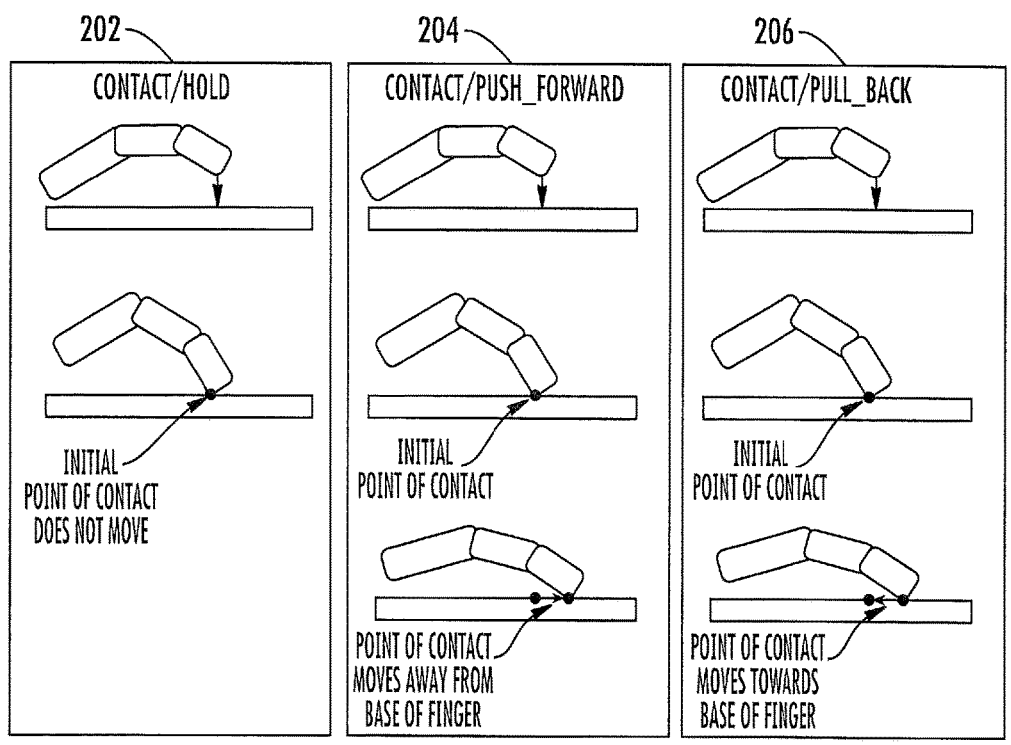
FIG. 2 is a diagram illustrating the primary horizontal finger movements used in KAT.

FIG. 2 is a diagram illustrating the primary horizontal finger movements used in KAT. KAT is based on three types of primary horizontal directional finger movements: Contact/Hold, Contact/Push_Forward and Contact/Pull_Back. The Contact/Hold directional movement involves the user either placing or holding the tip of a finger in contact with the touch screen. The Contact/Push_Forward directional movement involves the user placing a finger tip in contact with the touch screen, then moving the point of contact of the finger tip away from the base of the finger, while the Contact/Pull_Back directional movement involves the user placing the finger tip in contact with the touch screen then moving the point of contact of the finger tip towards the base of the finger. In the discussion that follows, the Contact/Hold movement will be typically be referred to as "Hold" (associated symbol="H") while Contact/Push_Forward and Contact/Pull_Back will typically be referred to as either "Left" or "Right", depending on the direction of movement of the finger on the touchscreen (associated symbols="L" or "R", respectively).

Although each finger is capable of performing three primary horizontal movements (i.e. Contact/Left, Contact/Hold and Contact/Right) the KAT encoding scheme actually enables each finger to generate eight (8) unique commands. This is accomplished by associating each command not with one of the primary finger movements, but with a sequence (i.e. gesture) comprised of two primary finger movements.

Figure 3:
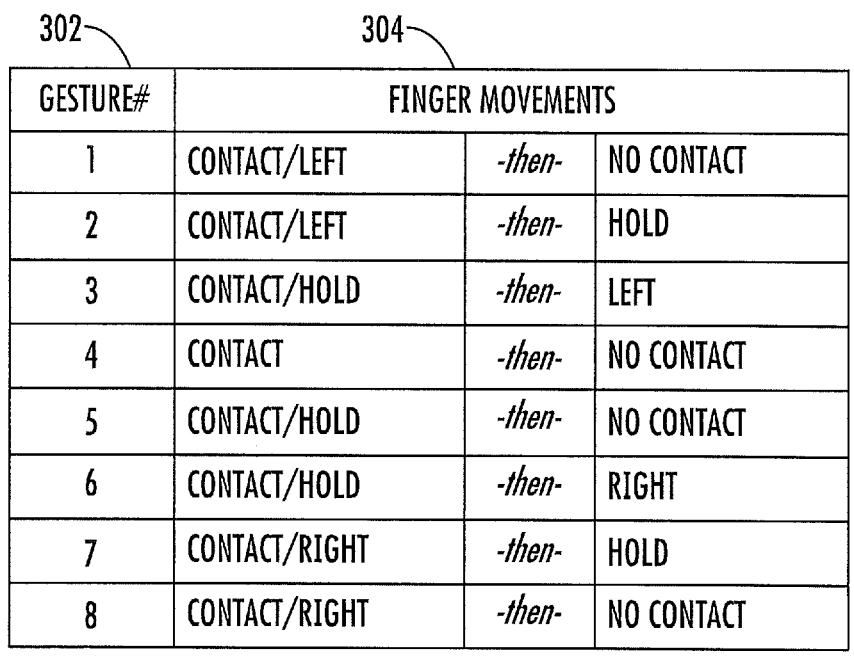
FIG. 3 is a table illustrating eight possible finger gesture commands for a user to use with KAT.

FIG. 3 is a table illustrating eight possible finger gesture commands for a user to use with KAT. A column 302 on the left lists a numbering of the gestures and a column 304 on the right lists the finger movements.

"Contact" is an action associated with the user's fingertip first touching (i.e. making contact with) the touchscreen.

"Hold" is an action associated with the user keeping their fingertip in contact with the touchscreen and stationary (i.e. minimal movement) for a predetermined period of time. Haptic feedback in the form of a small vibration (that is perceived by the user as a thunk or thud) is often used to let the user know they have held their finger stationary for the predetermined amount of time and the system has registered their input as a "Hold" movement. "No Contact", also referred to as "Release" is an action associated with the user lifting their finger so it is no longer in contact with the touchscreen.

Figure 4:
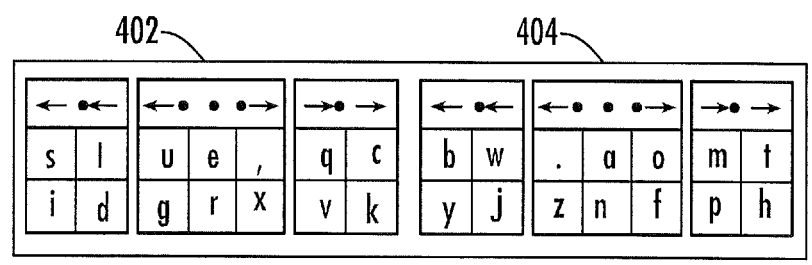
FIG. 4 is a diagram illustrating a mapping of gesture commands to characters—a character map.

FIG. 4 is a diagram illustrating a mapping of gesture commands to characters. Since in the KAT encoding scheme each individual finger key can produce 8 unique gesture commands, four fingers (typically the right-index, right-middle, left-index, and left-middle) are capable of generating at least 28 characters. In some embodiments, these characters are the 26 letters of the alphabet plus a period and comma as shown in FIG. 4. The first two rows on the right side of this figure (shown in blue) are the movements associated with the index and middle finger of the right hand, while the first two rows on the left side of this figure (shown in red) are the movements associated with the index and middle finger of the left hand. The correspondence between gesture commands and characters in FIG. 4 is typically referred to as the "Character Map" in the text that follows. The arrow and dot icons in FIG. 4 illustrate how the user should move their fingers to type the various letters. A dot icon represents a hold action while the left and right arrow icons represent the direction to move the finger tip once it is in contact with the touchscreen.

Figure 5:
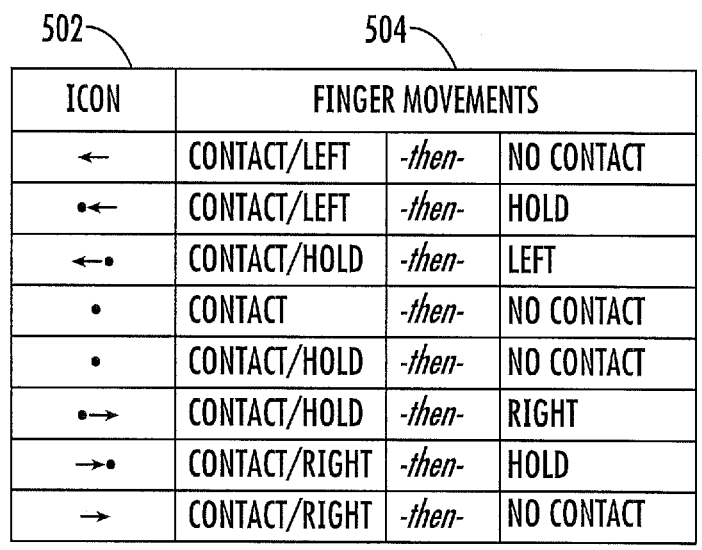
FIG. 5 is a chart illustrating icons associated with horizontal finger movement gesture commands for the left hand.

FIG. 5 is a chart illustrating icons associated with horizontal finger movement gesture commands for the left hand. The chart includes a left column 502 showing the icons and a right column 504 showing the finger movements corresponding to the icons. The KAT encoding scheme also can detect up and down movements of the left and right fingers, e.g. the left and right index fingers.

Figure 6:
FIG. 6 is a chart illustrating icons associated with vertical finger movement gesture commands, which can be given by fingers on the right or left hand, typically index fingers.

FIG. 6 is a chart illustrating icons associated with vertical finger movement gesture commands, which can be given by fingers on the right or left hand, typically index fingers. The chart includes a left column 602 showing the icons and a right column 604 showing the finger movements corresponding to the icons.

Figure 7A:
FIG. 7a shows the KAT command set comprised of the 22 possible finger movements assuming up, down, left, right and hold primary finger movements.
Figure 7B:
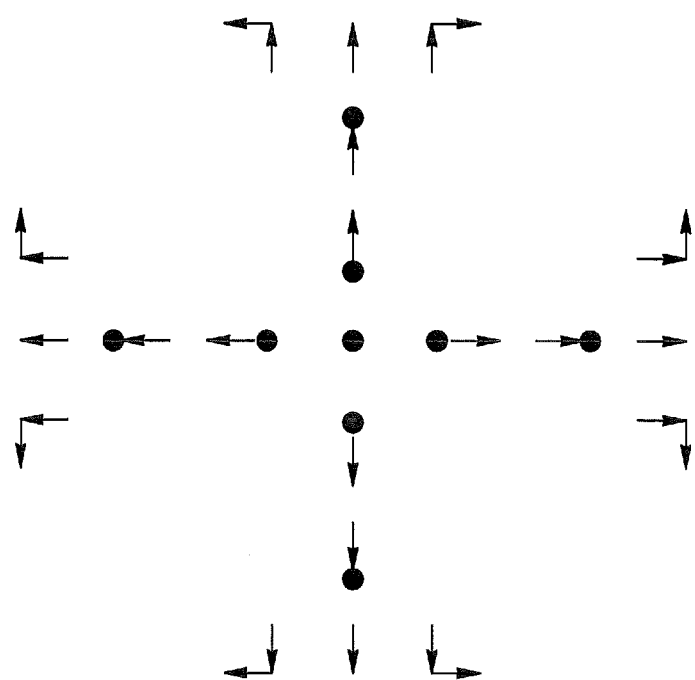
FIG. 7b shows the associated icons along with their spatial arrangements.

FIG. 7*a* shows the KAT command gesture set comprised of the 22 possible finger movements assuming up, down, left, right and hold primary finger movements. FIG. 7*b* shows the associated icons along with their spatial arrangements.

Figure 8:
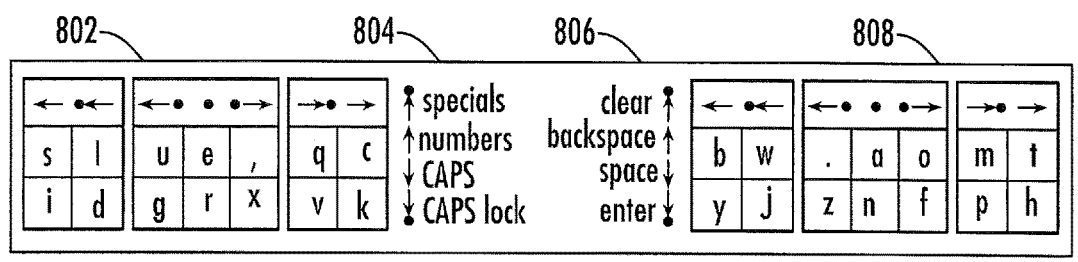
FIG. 8 shows a mapping of the KAT command set to the 26 letters of the alphabet plus comma and period as well as enter, space, backspace and clear/delete key commands as well as shift selectors to access special characters, numbers and capital characters normally used when entering text.

FIG. 8 shows a mapping of the KAT command gesture set to the 26 letters of the alphabet plus comma and period as well as to enter, space, backspace and clear/delete key commands normally used when entering text. The KAT encoding scheme also enables vertical gestures to invoke shift commands to enable the typing of numbers and special characters and for Caps (i.e. Capital letters), Cap Lock and function key commands. Configured in this way, the KAT command gesture set and encoding scheme is easily capable of producing a total of 144 characters, more than enough to encode the full set of 128 ASCII characters or to emulate the function of the standard 101-key QWERTY computer keyboard. Taking into account there are a total of 14 vertical gesture movements, in other embodiments the KAT encoding scheme is capable of generating a total of (14+1)*28=420 alphanumeric characters using only 4 fingers (which are typically comprised of the index and middle fingers on the left and right hands).

Figure 9:
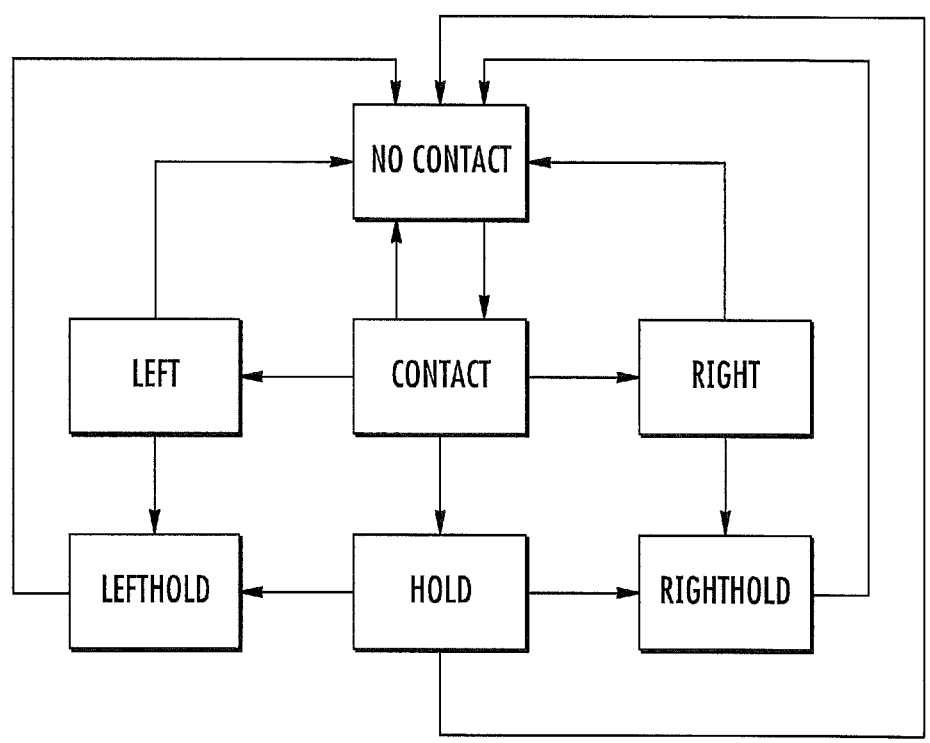
FIG. 9 is a state transition diagram for horizontal finger movements.

FIG. 9 is a state transition diagram for horizontal finger movements. The seven main KAT states shown in the state transition diagram of FIG. 9 associated with horizontal movements of the fingers with respect to the touchscreen sensor are "Left" (abbreviated as "L"), "Right" (abbreviated as "R"), "Hold" (abbreviated as "H"), "LeftHold" (abbreviated as "LH"), "RightHold" (abbreviated as "RH"), "Contact" (abbreviated as "C") and No Contact (abbreviated as "N"). Contact is a state associated with detection of a finger making initial contact with the touchscreen sensor, Left is a state associated with detection of a finger moving in a leftward direction a predetermined distance, Right is a state associated with detection of a finger moving in a rightward direction a predetermined distance, Hold is a state associated with detection of a finger remaining stationary (i.e. minimal movement) for some predetermined period of time, LeftHold is a state associated with detection of a finger moving either in a leftward direction a predetermined distance then remaining stationary for a predetermined period of time or remaining stationary for a predetermined period of time then moving leftward a predetermined distance, RightHold is a state associated with detection of a finger moving either in a rightward direction a predetermined distance then remaining stationary for a predetermined period of time or remaining stationary for a predetermined period of time then moving rightward a predetermined distance, and No Contact, also referred to as "Release", is a state associated with detection of a finger no longer touching (i.e. being in contact) with the touch screen sensor.

Figure 10:
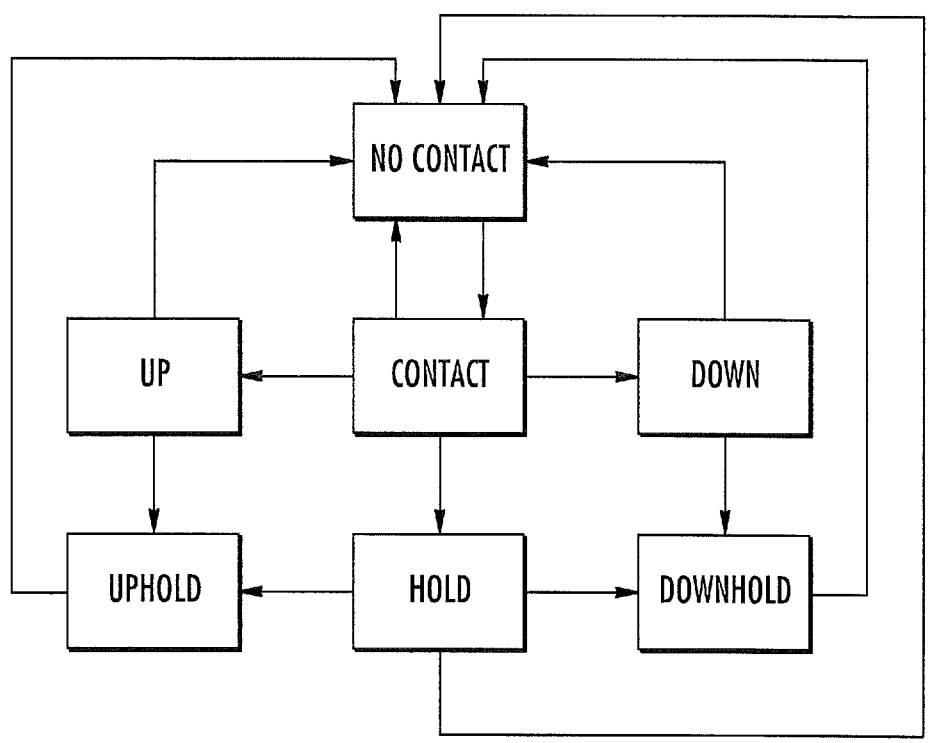
FIG. 10 is a state diagram for vertical finger movements.

FIG. 10 is a state diagram for vertical finger movements. The seven main KAT states shown in the state transition diagram of FIG. 10 associated with vertical movements of the fingers with respect to the touchscreen sensor are "Up" (abbreviated as "U"), "Down" (abbreviated as "D"), "Hold" (abbreviated as "H"), "UpHold" (abbreviated as "UH"), "DownHold" (abbreviated as "DH"), "Contact" (abbreviated as "C") and No Contact (abbreviated as "N"). Contact is a state associated with detection of a finger making initial contact with the touchscreen sensor, Up is a state associated with detection of a finger moving in a upward direction a predetermined distance, Down is a state associated with detection of a finger moving in a downward direction a predetermined distance, Hold is a state associated with detection of a finger remaining stationary (i.e. minimal movement) for some predetermined period of time, UpHold is a state associated with detection of a finger moving either in a upward direction a predetermined distance then remaining stationary for a predetermined period of time or remaining stationary for a predetermined period of time then moving Upward a predetermined distance, DownHold is a state associated with detection of a finger moving either in a downward direction a predetermined distance then remaining stationary for a predetermined period of time or remaining stationary for a predetermined period of time then moving downward a predetermined distance, and No Contact is a state associated with detection of a finger no longer touching (i.e. being in contact) with the touch screen sensor.

Figure 11:
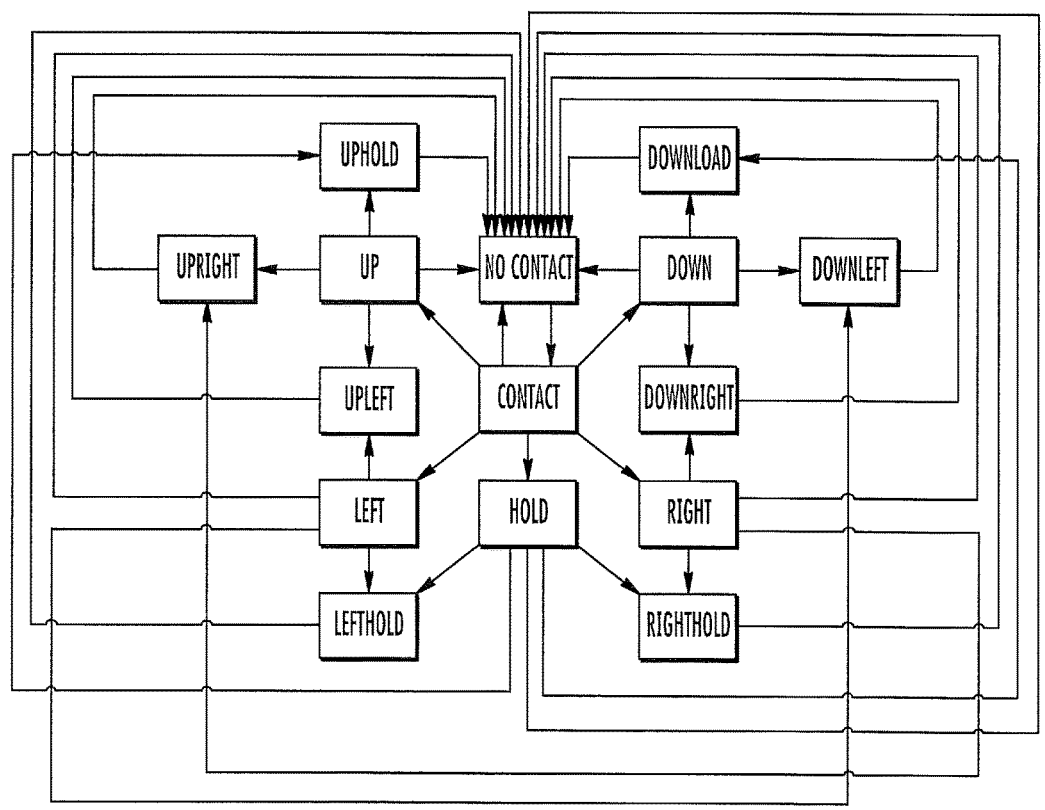
FIG. 11 is a KAT state transition diagram for combined horizontal and vertical finger movements.

FIG. 11 is a KAT state transition diagram for combined horizontal and vertical finger movements. The diagram covers the 15 total states associated with combined horizontal and/or vertical movements of a finger.

The KAT encoding scheme allows 8 distinct finger movement gestures to be detected based on sequences of the 7 primary states (C, L, R, H, LH, RH and N) or (C, U, D, H, UH, DH and N) shown in FIGS. 9 and 10 for horizontal and vertical finger movements, respectively. The discussion that follows relates to sequences of horizontal finger gestures. The same logic would apply to sequences of vertical finger movement gestures (in this case U would be substituted for L and D substituted for R).

Figure 12A:
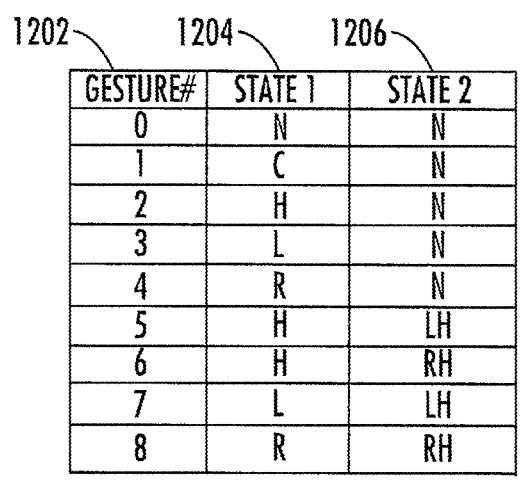
FIG. 12a is a chart illustrating two-state gesture sequences for horizontal finger movements.

FIG. 12a is a chart illustrating two-state gesture sequences for horizontal finger movements. FIG. 12b is a chart illustrating two-state gesture sequences for both horizontal and vertical finger movements.

For example, Gesture3 is associated with a finger moving left a predetermined distance after making contact with the touch screen then being lifted so it is no longer in contact with the touchscreen, whereas Gesture7 is associated with the finger moving left a predetermined distance after making contact with the touch screen then being held stationary for a predetermined period of time. This is in contrast to Gesture5 which is associated with the finger remaining stationary after making contact with the touchscreen for a predetermined period of time then moving left a predetermined distance.

Figure 13:
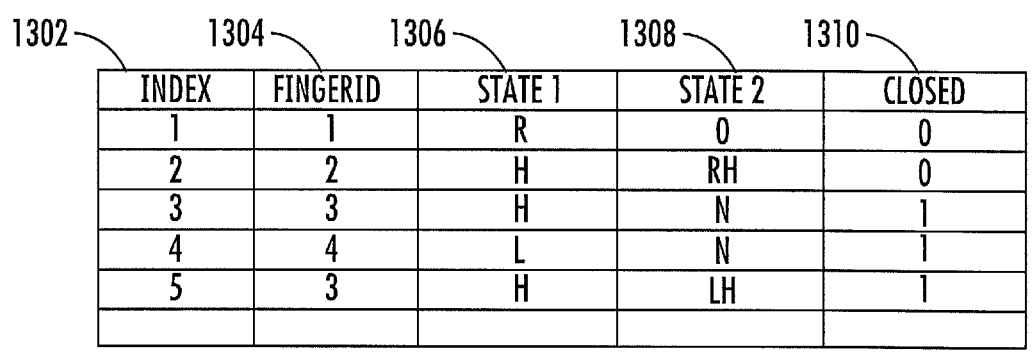
FIG. 13 is an example chart illustrating a KAT reservation queue.

FIG. 13 is an example chart illustrating a KAT reservation queue. In the KAT system a "Reservation Queue" is used to provide the user with the ability to input characters using overlapping finger motions, commonly known as "rollover". That is, rollover is where one finger begins a motion to type a first character, but before that motion is completed, another finger begins its motion to type a second character. Support for "rollover" in KAT is important as it enables rapid entry of text and data on touchscreen devices.

The Reservation Queue, an example of which is shown in FIG. 13 below for horizontal finger movements, is a First-In/First-Out (FIFO) queue which ensures that concurrent use of two or more fingers generates outputs in the correct temporal order based on when a gesture associated with each finger is initiated, not when it is completed. A similar Reservation Queue data structure is used to queue vertical finger movements. Each row of the Reservation Queue shown in FIG. 13 represents a reservation for a horizontal finger gesture command and is comprised of the following data fields:

Index: indicates the location of a finger gesture reservation in the Reservation Queue FingerID: the ID number associated with a particular finger (ranges from 1 to 4) making the reservation State1: a C, L, R, or H state detected after a transition from the N state State2: an L, R, H, LH, RH or N state Closed: indicates whether a gesture's two-state sequence has been completed. 0 indicates the user's finger is still in contact with the touchscreen while 1 indicates the finger is in the N (i.e. "No Contact") state.

When a transition between the N state and the C state in FIG. 9 for a finger is initially detected, a reservation is opened at the bottom of the Reservation Queue for the associated finger (using its Finger ID) and the State1 field for that reservation is filled in with a C, while the State2 data field is set to null (i.e. initialized to 0). When a subsequent state transition is detected for a finger that is not N to C, the Reservation Queue is first checked for an open reservation for the associated finger ID (i.e. an Reservation Queue entry where the State 1 data field=C or the State2 data field=0). Once the reservation is found for that fingerID, if the State1 data field=C and the new state is not N, the State1 data field is updated with an L, R, or H, as appropriate. If the new state is N, the State2 data field is updated with N, otherwise the State2 data field is updated with an L, R, or H, LH or RH, as appropriate. Finally, when the state transition detected for a finger is to the N state, signifying that the user has lifted their finger (i.e. removed it from contact with the touch screen sensor), the reservation for that fingerID is closed by setting the "Closed" data field=1.

The Reservation Queue descried above supports rollover as follows: Since a specific sequence of two states is associated with each gesture, when a user's finger initially makes contact with the touchscreen then moves left a predetermined distance (i.e. causing a transition to the "Right" or R state), it is not known whether they will hold their finger at this position for a predetermined amount of time (i.e. causing a transition to the "RightHold" or RH state) or whether they will lift their finger off the touchscreen (which would cause a transition to the "No Contact" or N state). As a result, no data can be entered into the State2 data field of the Reservation Queue at this time, so the reservation is considered "open". If a second finger is activated before the first finger's reservation is closed (which would occur by detecting a transition of the first finger to the "No Contact" or N state) a second reservation is opened for the second finger in the Reservation Queue (based its FingerID) and queued behind the first finger's reservation. In this way, "rollover" is supported by allowing one or more fingers to initiate two-state gestures in quick succession while at the same time ensuring that the associated characters/commands are generated in the proper temporal order based on when the gesture was initiated, not when it was completed.

FIG. 14 is a chart illustrating an example scenario, where each numbered line is associated with a corresponding Reservation Queue index. The data shown in the example Reservation Queue of FIG. 13 is based on the example scenario of FIG. 14.

Subsequently, once Finger1 is lifted from the touchscreen the associated transition to the N state will cause the reservation associated Queue Index=1 to be closed. Since this reservation is at the top of the Reservation Queue the result of closing this reservation will be to pop it off the top of the queue and generate a character or command associated with detection of Gesture x on Finger1. After this occurs, the reservation associated with Finger2 will now be at the top of the Reservation Queue. Once an N state is detected for Finger2 not only will this reservation be closed and the associated character or command generated associated with detection of Gesture 6 on Finger2, but all the other reservations will be popped off the queue, and their corresponding character/commands generated in the order in which they were placed on the queue. This type of functionality ensures that the character and/or commands associated with each finger gesture are generated in the order in which the gestures were initiated, not the order in which they were completed.

Figure 15:
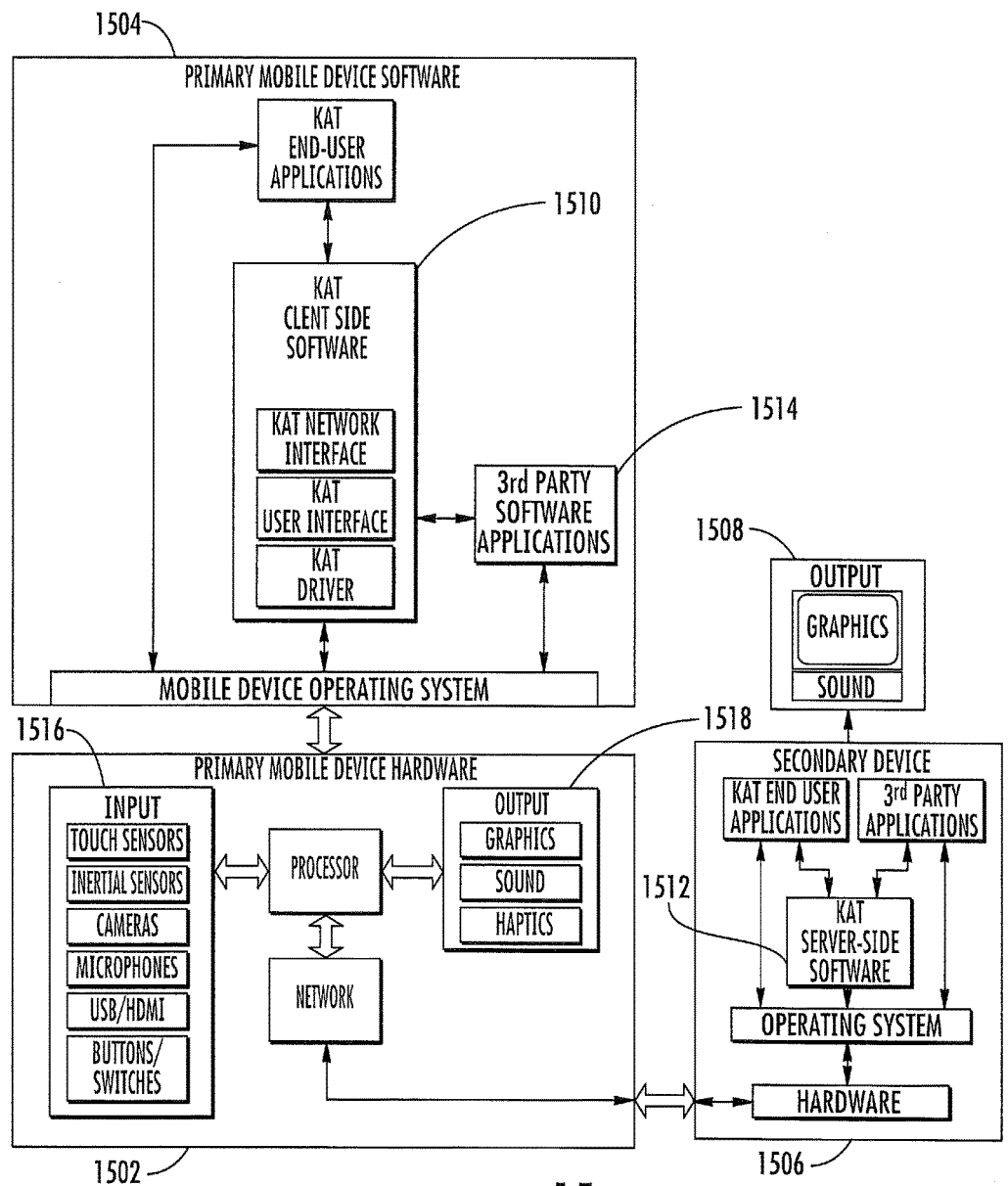
FIG. 15 is a block diagram illustrating the overall KAT system architecture.
Figure 16:
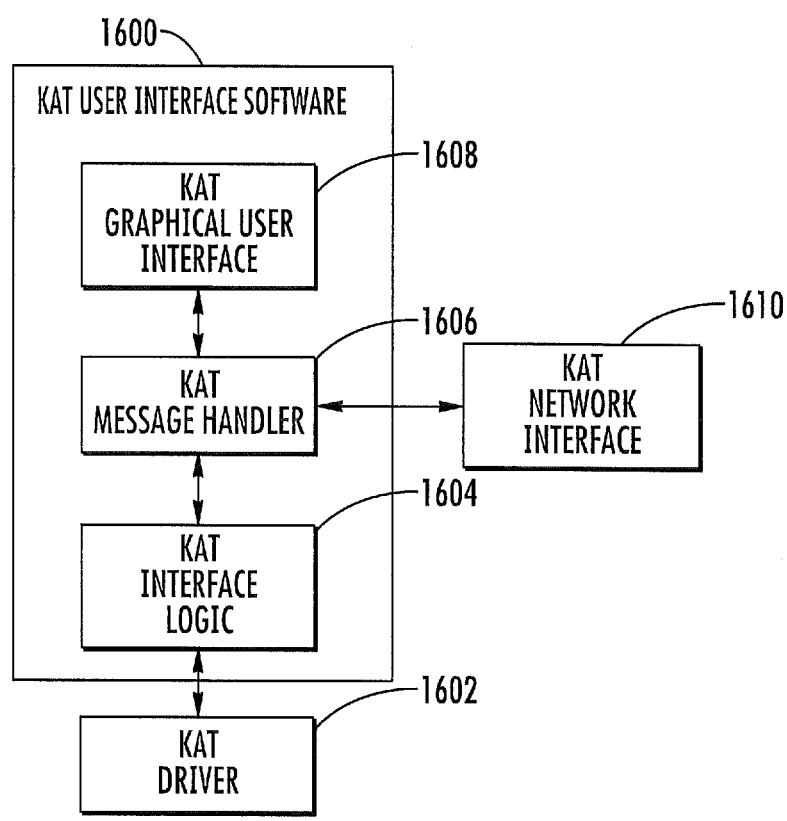
FIG. 16 is a block diagram of the KAT client-side software, which shows an overview of the functionality of the KAT user interface shown in the client-side software block of FIG. 15.

FIG. 15 is a block diagram illustrating the overall KAT system architecture. FIG. 16 is a block diagram showing an overview of the functionality of the KAT user interface 1600 shown in the KAT client-side software block 1510, of FIG. 15.

Figure 17:
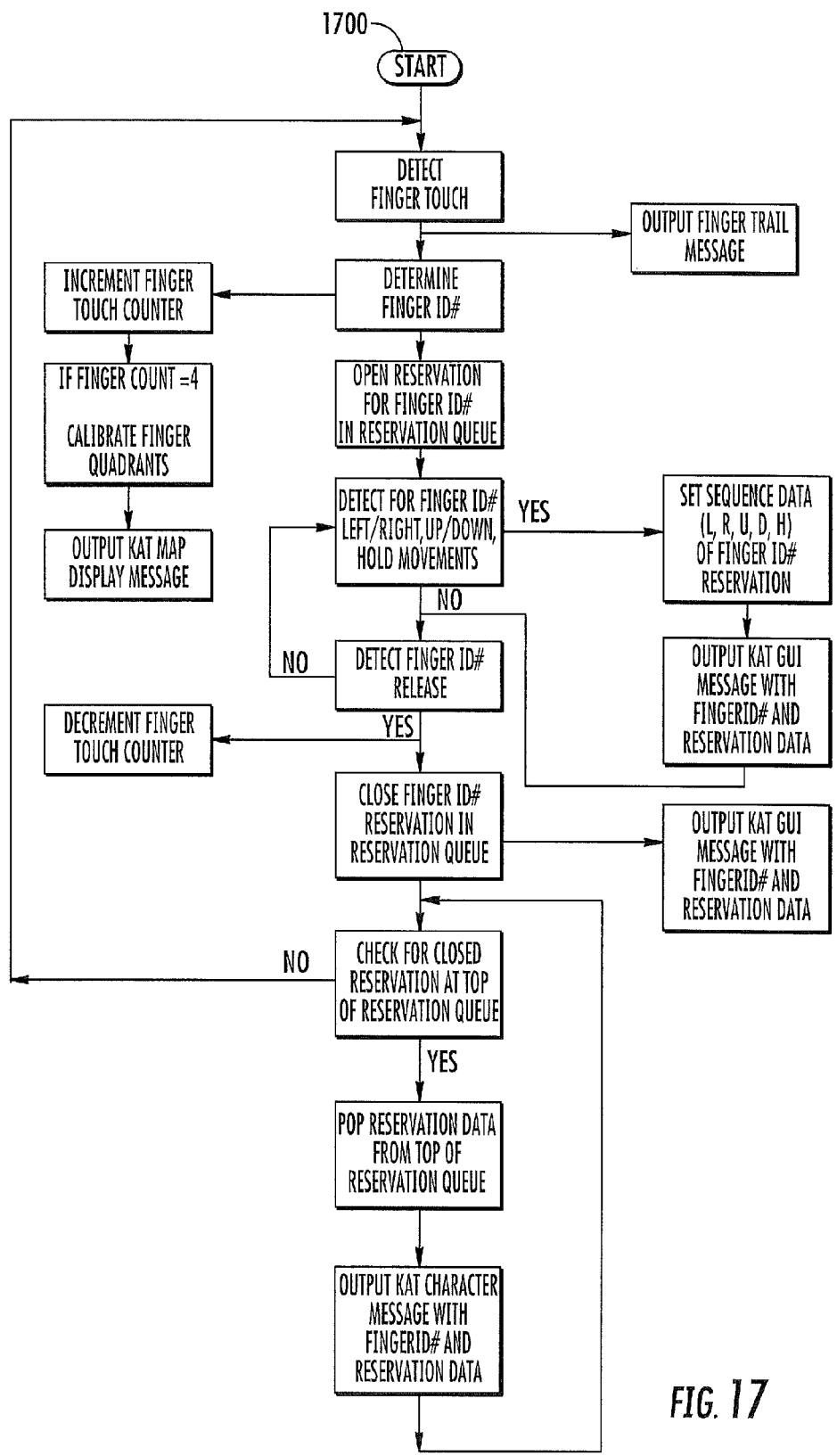
FIG. 17 is a block diagram of the KAT interface logic.

The KAT User Interface 1600 communicates with a KAT Driver 1602 which provides a platform independent application programming interface (API) allowing KAT interfaces to be easily ported between different types of mobile devices (i.e. Windows, Android, IOS, etc.). The KAT Driver functionality includes device input/output functions such as getting input data from input sensors 1516 such as a touchscreen sensor as well as data from other sensors such as cameras, inertial measurement units (i.e. accelerometers, gyros, magnetometers), microphones and from buttons and switches which are part of the primary mobile device hardware 1502. The KAT driver also can output characters and commands to a mobile device's virtual keyboard buffer and 3rd party applications 1514 as well as communicate with output device hardware 1518 to update the graphics on the device display screen, play sounds and trigger haptic feedback. The KAT Network Interface 1610 shown in FIGS. 15 and 16 communicates with a KAT Server 1512 running on a secondary device 1506 and can be configured to use either a wired or wireless network connection. FIG. 17 is a detailed block diagram of the KAT interface logic 1604.

The KAT interface logic (1604 and 1700) is responsible for detecting when a finger makes contact with the touchscreen; determining the number of fingers in contact with the touchscreen; associating a finger ID# with each finger in contact with the touchscreen; outputting a KAT Finger Trail Message 1902 to the KAT Message Handler 1606 to a display screen that graphically shows the movement trajectory of a finger in contact with the touchscreen; detecting left/right, up/down, hold and release finger movements; opening, closing and updating reservations in a Reservation Queue; outputting KAT GUI Messages (1906 and 1908) to the KAT Message Handler 1606 containing FingerID#, reservation data and/or hide/show display information; popping reservation data from the top of the Reservation Queue and outputting KAT Character Messages 1906 containing Finger ID# and reservation data.

Figure 18:
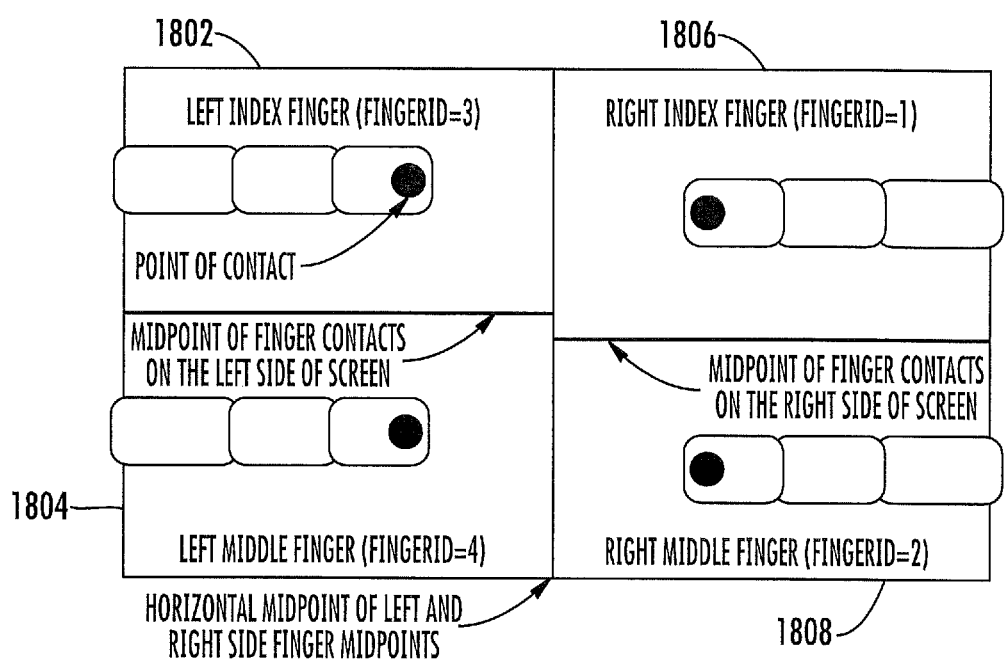
FIG. 18 is a diagram illustrating the touch screen finger quadrants used to determine the gesture inputs for each of the four fingers.

FIG. 18 is a diagram illustrating the touch screen finger quadrants used to determine the gesture inputs for each of the four fingers. An initial calibration of the quadrant boundaries is accomplished by having the user simultaneously touch the touchscreen sensor with all four fingers and hold them in contact with the touchscreen for a predetermined period of time. The quadrant boundaries are then determined by first identifying the index and middle fingers on the left and right sides of the touchscreen. Given this knowledge, the vertical midpoint of the finger positions of the left side of the screen is computed and becomes boundary between the upper-left and lower-left quadrants of the left half of the screen while the vertical midpoint of the finger positions on the right side of the screen is computed and becomes boundary between the upper-right and lower-right quadrants of the right half of the screen. The boundary line between left and right sides of the screen is then determined by the average horizontal position of the left and right vertical midpoint values computed previously. Other schemes are possible for determining the boundaries between finger quadrants that take into account the mean and variance of the finger touch positions, finger positions associated with correctly typed characters, finger positions that result in error corrections and/or the tracking of finger movement trajectories while fingers are in contact with the touch sensor.

Figure 20:
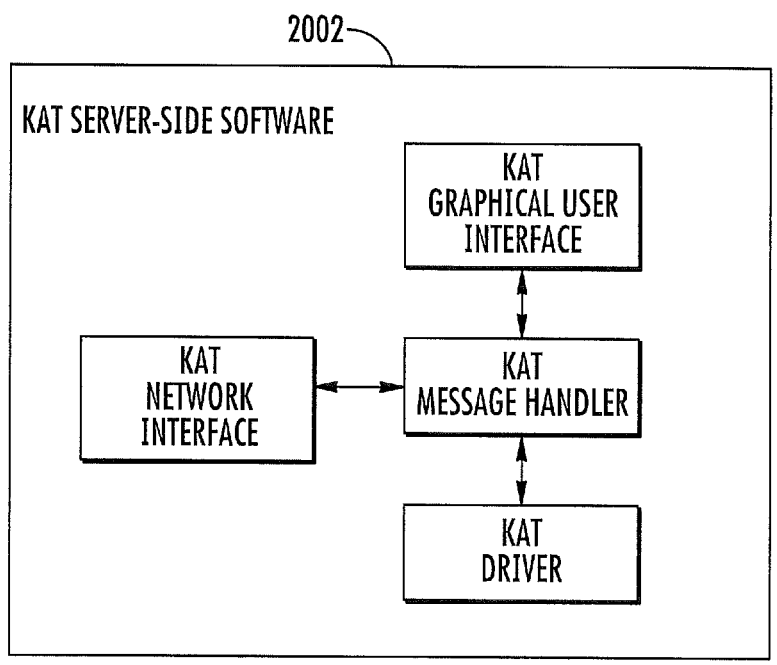
FIG. 20 is a block diagram of the KAT server-side software.

The KAT Message Handler 1606 receives messages from the KAT Interface Logic 1604 and routes them to either software running on the primary mobile device associated with implementing the KAT Graphical User Interface 1608 or through the KAT Network Interface 1610 to the KAT server 1512 running on a secondary device which is capable of reproducing the KAT Graphical User Interface on a separate machine. FIG. 19 is a chart illustrating the message formats for the four main KAT Messages. FIG. 20 is a block diagram of the KAT server-side software.

Figure 21:
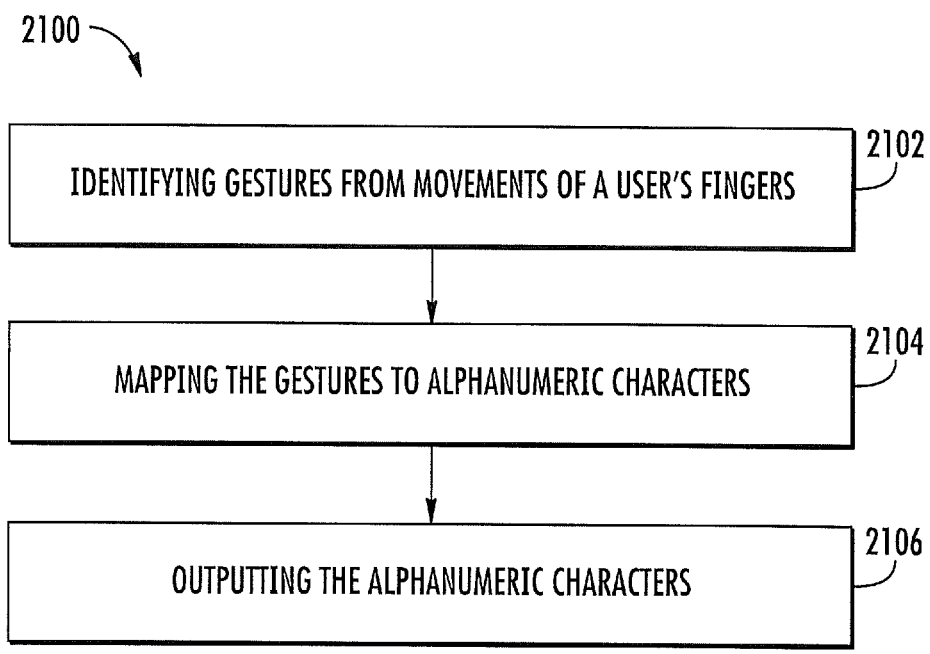
FIG. 21 is a flow diagram of an example method 2100 performed by a device.

FIG. 21 is a flow chart diagram of an example KAT user interface method 2100 performed by a device. The device includes a housing and a touch sensor on or in a surface of the housing, and the touch sensor is configured to detect gestures made by a user's fingers. At least some of the gestures include directional movements of the user's fingers in a plane of the surface of the touch sensor. The device can include a haptic feedback mechanism for providing haptic feedback to the user to indicate gesture temporal boundaries. The device can include one or more processors and a memory storing instructions for gesture identifier and character generator methods that, when executed by the one or more processors, causes the device to perform the method 2100.

The gesture identifier method (2102) of the KAT user interface identifies gestures from movements of the user's fingers on the touch sensor. The housing can form a cover for a mobile communications device and the touch sensor can be integrated within the cover. In some examples, the housing includes a first surface for holding a display and a second surface facing opposite the first surface, and the touch sensor is located on the second surface. The display can be configured to display the alphanumeric characters to the user. The character generator method (2104) maps the gestures to alphanumeric characters (2104). In some examples, the KAT user interface (2100) outputs characters without the need for the user to view an onscreen display of the mapping between gestures and characters.

The gesture identifier can distinguish between directional finger movements in vertical and horizontal directions. The gesture identifier can identify a gesture using movements of at least two fingers on at least one of a user's hands. The character generator can include a character map and use the character map to map the gestures to alphanumeric characters. The character map can be configurable to change mappings between the gestures and the alphanumeric characters.

In some examples, the gesture identifier is configured to differentiate between finger movements occurring in different regions of the surface of the touch screen and to use the region in which a finger movement occurs to identify a gesture for the movement. The gesture identifier can be configured to allow gestures from different fingers to overlap in time. The gestures that overlap in time include a first gesture corresponding to a first character and a second gesture corresponding to a second character, wherein the first gesture is initiated before but completed after a second gesture, and wherein the KAT user interface outputs the first character prior to the second character.

The KAT user interface (2100) includes a method (2106) that outputs the alphanumeric characters based on the gestures identified. In some examples, the device includes a display device that displays the alphanumeric characters. In some examples, the KAT user interface outputs the alphanumeric characters to a display located remotely from the touch sensor. The KAT user interface can operate as a client and communicate the alphanumeric characters to a remote server.

The natural division of labor between the thumb and finger movements on each hand, combined with the intuitive KAT encoding scheme described above results in a man/machine computer interface that is very easy to learn and use.

The selection of the words in the Character Map is based on the frequency of occurrence of individual characters and character pairs in the English language and has been optimized to balance ease of learning versus efficiency of use. The most frequently typed letters such as t, s, e, a, etc. are associated with primary movements (i.e. Push_Forward, Pull_Back, Hold) on the most dexterous fingers and common letter pairs such as th, is, re, an, of, etc. are associated with the same movements on adjacent fingers. For example, in order to type the word "the", one would simply perform the following actions:

1. touch the touchscreen with index and middle fingers of the right hand
2. pull these two fingers back to the right towards the base of the hand (while remaining in contact with the touchscreen) with the "t" back motion on the index finger initiated slightly before the "h" back motion on the middle finger,
3. lift the two fingers after they have been pulled back so they are no longer in contact with the touch screen. At this point the "t" and "h" characters would have been typed. Next,
4. touch the touchscreen with the index finger of the left hand then lift it so it is no longer in contact with the touch screen. At this point the letter "e" will have been typed.

With a little practice, typing on using KAT is analogous to making hand gestures, where commonly typed characters, character pairs and small words become associated with a single coordinated hand motion.

Given that the set of words contained in the Character Map of FIG. 3 has been optimized for typing the English language, tasks other than typing English will most likely require a different arrangement. To arrange the character map, the following procedure can be followed.

1. Anchor the most commonly used bigrams (for example, "er", "an", "th", "is") then randomly place rest of the 26 letters of the alphabet plus "." and "," in the keyboard layout.
2. Evaluate the score of the letter arrangement using the cost function below:

$$KeyboardScore = \left(\sum_{i=1}^{2}\sum_{j=1}^{2}\sum_{k=1}^{7} hand_i * finger_j * col_{ik} * letter_{ijk}\right) + \left(\sum_{i=1}^{2}\sum_{j=1}^{7} hand_i * col_{ij} * bigram_{ij}\right)$$

Where $hand_i$ is the weight of left hand (=1) or right hand (i=2)

$finger_j$ is the weight of first finger (j=1) or second finger (j=2)

$col_{ik}$ is the weight of col (k=1 to 7) on hand i $letter_{ijk}$ is the frequency of the letter in the location ijk on the keyboard. That is, the $i^{th}$ hand, $j^{th}$ finger and $k^{th}$ column $col_{ij}$ is the weight of col (j=1 to 7) on hand i $bigram_{ij}$ is the frequency of the bigram in the ij location on the keyboard. That is, the $i^{th}$ hand, $j^{th}$ column The weight values are as follows:

Hand

| Hand | |
|---|---|
| Left (1) | Right (2) |
| 1.25 | 1 |

Finger

| Finger | Weight |
|--------|--------|
| F1     | 1      |
| F2     | 1.5    |

3. Rearrange the letters using a method such as simulated annealing to find the highest keyboard score. In simulated annealing, a specific starting "energy" value is initialized that decreases logarithmically, and even if a change in the keyboard layout would result in a lower overall score, that layout still has a chance of being selected randomly depending on its energy at that state. This makes up for the local maximum problem that is present in a greedy algorithm.

Applications of a KAT interface include integration and/or use with: game controllers, handheld remote control devices (such as those used to operate televisions, cable or internet set top boxes, consumer electronics or other remotely operable equipment), automobile steering wheels, handheld barcode scanners, cameras and head-mounted displays. Basically any type of man/machine interface that would benefit from the ability to input data, text and commands without looking (i.e. without the need for the user to see their hands or the position of their fingers on an input device or sensor). The KAT interface also can be connected to a KAT server running on a separate computer or device using either wireless or wired connections to enable input of data, text and commands associated with or relevant to the remote operation of the computer or device.

One embodiment of the KAT user interface involves entering text, data and commands with four fingers comprised of the index and middle fingers on the left and right hands. Other embodiments are also possible that use only a single finger on one hand. For example, to implement typical video control functions such as play, stop, rewind, fast forward, fast rewind, previous page/track, next page/track. In another embodiment of a KAT user interface a user can input text, data and commands using the four fingers (i.e. index, middle, ring and pinky fingers) on a single hand,

What is claimed is:

1. A user input device comprising:
 a housing comprising at least one touchable surface;
 a touch sensor located in or on the at least one touchable surface, the touch sensor being configured to detect movements made by at least one of a user's fingers, wherein said movements of the user's finger comprises at least a hold motion wherein a finger is held stationary and in contact with the touch sensor for a predetermined period of time, a release motion where a finger is lifted such that it is no longer in contact with the touch sensor and a directional motion wherein a finger is moved on at least one surface of the touch sensor; and
 a user interface operatively associated with the touch sensor comprised of:
  a gesture identifier for determining at least seven different gestures from sequences of said movements of a single user's finger, wherein the gesture identifier identifies the at least seven different gestures based on sequences of at least two states from the following set of states: a contact state, a no contact state, a hold state, a finger movement in a first direction state, and a state comprised of a finger movement in a first direction followed by a hold;
  a character generator for mapping the identified gestures to alphanumeric characters and for outputting said characters based on the gestures identified.

2. The user input device of claim 1 wherein the set of states also includes a state associated with finger movement in a second direction and a state comprised of a finger movement in a second direction followed by a hold.

3. The user input device of claim 1 wherein the housing forms a cover for a mobile communications device and wherein the touch sensor is integrated within the cover.

4. The user input device of claim 1 wherein the housing comprises a housing for a mobile device, the housing including a first surface for holding a display and a second surface facing opposite the first surface, wherein the touch sensor is located on the second surface.

5. The user input device of claim 4 wherein the display is configured to display the alphanumeric characters to the user.

6. The user input device of claim 1 wherein the user interface is configured to output the alphanumeric characters to a display located remotely from the touch sensor.

7. The user input device of claim 1 wherein the user interface is configured to operate as a client and to communicate the alphanumeric characters to a remote server.

8. The user input device of claim 1 wherein the user interface is configured to identify the characters without requiring the user to select the characters from a visual display of the characters.

9. The user input device of claim 1 wherein the user interface is configured to distinguish between directional finger movements in horizontal and vertical directions.

10. The user input device of claim 1 wherein the user interface is configured to identify gestures associated with movements of at least two fingers on at least one of a user's hands.

11. The user input device of claim 1 comprising a character map, wherein the user interface utilizes the character map to map the gestures to the alphanumeric characters.

12. The user input device of claim 11 wherein the character map is configurable to change mappings between the gestures and the alphanumeric characters.

13. The user input device of claim 1 wherein the user interface is configured to differentiate between finger movements occurring in different regions of the surface of the touch screen and to use the region in which a finger movement occurs to identify a gesture for the movement.

14. The user input device of claim 1 wherein the user interface is configured to allow gestures from different fingers to overlap in time.

15. The user input device of claim 14 wherein the gestures that overlap in time include a first gesture corresponding to a first character and a second gesture corresponding to a second character, wherein the first gesture is initiated before but completed after a second gesture, and wherein the user interface outputs the first character prior to the second character.

16. The user input device of claim 1 comprising a haptic feedback mechanism for providing haptic feedback to the user to indicate gesture temporal boundaries.

17. A method for receiving user input, the method comprising:
 detecting, by a device comprising a housing and a touch sensor located in or on a surface of the housing, gestures made by a user's fingers, wherein at least some of the gestures comprise directional movements of the user's fingers on at least one surface of the touch sensor; and identifying gestures from the movements of a single user's finger, mapping the gestures to alphanumeric characters, and outputting the characters, including identifying at least seven different gestures based on sequences of at least two states from the following set of states: a contact state, a no contact state, a hold state, a finger movement in a first direction, a finger movement in a second direction.

18. The method of claim 17 wherein the housing forms a cover for a mobile communications device and wherein the touch sensor is integrated within the cover.

19. The method of claim 17 wherein the housing comprises a housing for a mobile device, the housing including a first surface for holding a display and a second surface facing opposite the first surface, wherein the touch sensor is located on the second surface.

20. The method of claim 19 wherein the display is configured to display the alphanumeric characters to the user.

21. The method of claim 17 comprising outputting the alphanumeric characters to a display located remotely from the touch sensor.

22. The method of claim 17 comprising operating as a client and to communicate the alphanumeric characters to a remote server.

23. The method of claim 17 comprising identifying the characters without requiring the user to select the characters from a visual display of the characters.

24. The method of claim 23 comprising distinguishing between directional finger movements in horizontal and vertical directions.

25. The method of claim 17 comprising identifying gestures associated with movements of at least two fingers on at least one a user's hands.

26. The method of claim 17 comprising utilizing a character map to map the gestures to the alphanumeric characters.

27. The method of claim 26 wherein the character map is configurable to change mappings between the gestures and the alphanumeric characters.

28. The method of claim 17 comprising differentiating between finger movements occurring in different regions of the surface of the touch screen and using the region in which a finger movement occurs to identify a gesture for the movement.

29. The method of claim 17 comprising allowing gestures from different fingers to overlap in time.

30. The method of claim 29 wherein the gestures that overlap in time include a first gesture corresponding to a first character and a second gesture corresponding to a second character, wherein the first gesture is initiated before but completed after a second gesture, and wherein the user interface outputs the first character prior to the second character.

31. The method of claim 17 comprising providing haptic feedback to the user to indicate gesture temporal boundaries.

32. A non-transitory computer readable medium having stored thereon executable instructions that when executed by a processor of a device control the device to perform steps comprising:

detecting, by a touch sensor located in or on a surface of a housing for the device, gestures made by a user's fingers, wherein at least some of the gestures comprise directional movements of the user's fingers on at least one surface of the touch sensor; and identifying gestures from the movements of a single user's finger, mapping the gestures to alphanumeric characters, and outputting the characters, including identifying at least seven different gestures based on sequences of at least two states from the following set of states: a contact state, a no contact state, a hold state, a finger movement in a first direction, a finger movement in a second direction.

* * * * *